United States Patent

Aronne

Patent Number: 5,261,630
Date of Patent: Nov. 16, 1993

[54] EJECTION SEAT CONTROL USING AIRCRAFT RADIO ALTIMETER

[75] Inventor: Armand J. Aronne, South Massapequa, N.Y.

[73] Assignee: Grumman Aerospace Corporation, Bethpage, N.Y.

[21] Appl. No.: 802,376

[22] Filed: Dec. 4, 1991

[51] Int. Cl.⁵ .................. B64D 25/11; B64D 25/112
[52] U.S. Cl. .................. 244/122 AE; 244/122 R; 244/122 AD; 244/122 AH
[58] Field of Search ............ 244/122, 122 A, 122 AE, 244/122 AD, 122 AB, 122 AH, 141

[56] References Cited

U.S. PATENT DOCUMENTS

| | | | |
|---|---|---|---|
| 2,931,598 | 4/1960 | Sanctuary | 244/122 AD |
| 3,190,589 | 6/1965 | Mennborg | 244/122 AB |
| 3,282,161 | 11/1966 | Macdonald, Jr. | 244/122 AB |
| 3,282,538 | 11/1966 | Mulkins | 244/122 AB |
| 3,363,662 | 1/1968 | McIntyre | 244/122 AB |
| 3,487,445 | 12/1969 | Gluhareff | 244/122 AD |
| 3,554,471 | 1/1971 | Hantzsch | 244/122 R |
| 3,554,472 | 1/1971 | McIntyre | 244/122 R |
| 3,592,419 | 7/1971 | Hantzsch | 244/122 AD |
| 3,648,955 | 3/1972 | Stencel | 244/122 AD |
| 3,726,499 | 4/1973 | Stencel | 244/122 AD |
| 3,740,005 | 6/1973 | Rivers | 244/122 AD |
| 3,802,651 | 4/1974 | Axenborg | 244/122 AD |
| 3,861,625 | 1/1975 | Sadler et al. | 244/122 AD |
| 3,979,088 | 9/1976 | McCormick | 244/122 AB |
| 3,979,089 | 9/1976 | Miller | 244/122 AD |
| 4,017,040 | 4/1977 | Dillinger | 244/122 AD |
| 4,216,928 | 8/1980 | Hooper | 244/122 AD |
| 4,236,687 | 12/1980 | Stone | 244/122 AD |
| 4,303,212 | 12/1981 | Stone | 244/122 AD |
| 4,613,100 | 9/1986 | Martin | 244/122 AD |
| 4,667,903 | 5/1987 | Herndone | 244/122 A |
| 4,673,147 | 6/1987 | Solomonides | 244/122 A |
| 4,721,273 | 1/1988 | Trikka | 244/122 AE |
| 4,946,421 | 7/1989 | Trikha | 244/122 AE |
| 5,133,515 | 7/1992 | Stratlan et al. | 244/122 AB |

OTHER PUBLICATIONS

Aronne, A. "Escape Low and Hot," Mechanical Engineering, May 1983, pp. 30–38.

*Primary Examiner*—Joseph F. Peters, Jr.
*Assistant Examiner*—Virna Lissi Ansley
*Attorney, Agent, or Firm*—Pollock, VandeSande & Priddy

[57] ABSTRACT

A pilot's ejection seat is propelled in an upward direction after ejection by employing a high gain signal from a radio altimeter on board an aircraft. The vertically downward high gain vector is inverted by adding 180° to its phase component and providing the resultant signal to an inexpensive gyro or assembly of gyros installed in the seat. The gyros are constantly updated with information concerning the upward vertical direction and upon ejection, the gyros maintain this information for a sufficient period of time to control the ejection seat propulsion system in a manner achieving a vertically upward trajectory that will enable the pilot to clear a disabled aircraft and achieve the orientation necessary to deploy a parachute.

5 Claims, 1 Drawing Sheet

EJECTION SEAT CONTROL USING AIRCRAFT RADIO ALTIMETER

FIELD OF THE INVENTION

The present invention relates to pilot ejection seats, and more particularly to an attitude control system for such a seat upon ejection.

BACKGROUND OF THE INVENTION

In military aircraft and several types of space vehicles, air crew escape is ensured by ejection seats. An ejection procedure generally follows the following course. A canopy or escape hatch is normally opened from the cockpit so as to clear an escape path. The pilots seat is ejected or catapulted from the aircraft or space vehicle. However, at the time of ejection it is extremely important for the upward direction to be established so that the self-contained propulsion system normally installed on the seat can orient the ejection seat in an upward direction. This is necessary to ensure clearance from the ejection seat from a normally descending disabled aircraft; and secondly for ensuring proper attitude of the ejection seat in preparation of parachute deployment.

Prior art escape systems can safely recover people from altitudes as low as 200 feet above ground level, even with the pilot ejected in an inverted position.

One prior art approach is reported in an article entitled "Escape Low and Hot" coauthored by Armand J. Aronne and James P. Murray, the article appearing in *Mechanical Engineering*, May 1983, pages 31-38. In this article a prior art system is described which uses passive radiation for transmitting a signal to a seat microprocessor which is programmed for roll-maneuvering. A pitch and roll sensing system provides rate information once the ejection seat is clear of the aircraft. A dual actuator control system positions the seat rocket so as to enable the seat to reorient itself into an upward trajectory. A drawback of the reported system as well as that of other prior art devices is the requirement that relatively large antennas be installed on the seat. Further, other problems become encountered which prevent the establishment of the upward direction with reliability.

BRIEF DESCRIPTION OF THE PRESENT INVENTION

The present invention is an improvement over the existing prior art and more particularly is concerned with means for establishing the upward direction for an ejected seat. The present invention does not alter the general mechanical structure of an ejection seat nor its propulsion system.

Aircraft normally include a radio altimeter for measuring terrain clearance. This is accomplished by detecting a true vertical direction from the aircraft by sensing a high gain vector in a received signal which will correspond with the vertically downward direction.

The present invention utilizes this information for determining the vertically upward direction. This is done by rotating the high gain vector by 180° and providing this information to a relatively inexpensive gyro which is added to the ejection seat. The gyro is updated with the inverted high gain vector information on an ongoing basis. Upon ejection, the gyro continues to hold this information for sufficient time to allow a propulsion system to propel the ejected seat in a vertically upward direction.

Since the gyro need only provide this information for a short time, relatively inexpensive and uncomplicated gyros may be employed which reduces the cost and increases the reliability of an ejection system.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1A:
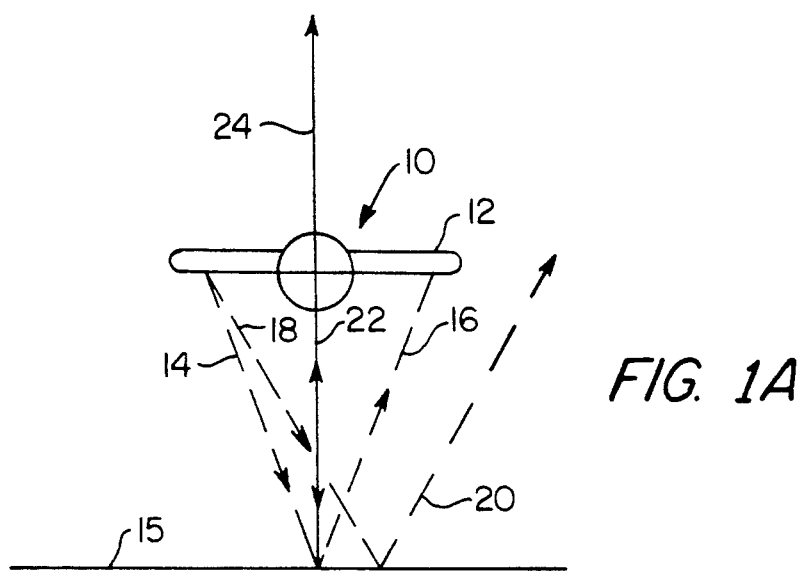
FIG. 1A is a diagrammatical illustration of an aircraft flying parallel to the ground and transmitting-receiving radio altimeter signals.

FIG. 1A diagrammatically illustrates an aircraft 10 having its wings 12 oriented in parallel flight to the ground 15. In order to determine terrain clearance, a radio altimeter is normally employed for emitting radio signals such as 14. Reflections from the ground generate a received radio signal such as 16 which is picked up by the radio altimeter. A number of altimeter signals are emitted, such as 18. In the event the angle of incidence with the ground is relatively great, the reflected radio signal, such as 20, falls outside the receiver range and is therefore not measured. Each received signal is measured as a vector. As will be appreciated, the true vertical transmitted-received signal 22 will be measured at the greatest intensity since there is minimum scatter of the received signal. Thus far described, conventional radio altimeter techniques are employed. The downward vertical vector 22 is commonly known as the high gain vector. As will be explained here and after, the downward vector 22 is inverted by 180° so that an upward vertical vector 24 is defined. The signal representing this upward vector 24 is employed to orient an ejection seat along an upward trajectory immediately upon ejection from an aircraft.

Figure 1B:
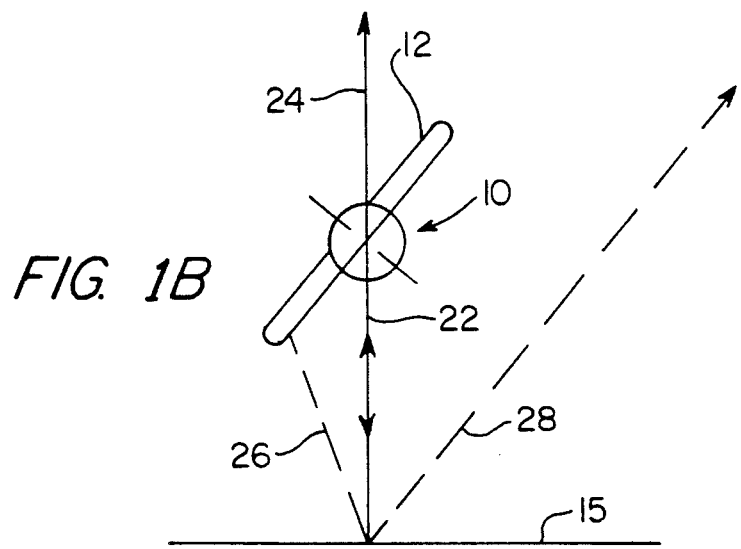
FIG. 1 is a diagrammatic view similar to that of FIG. 1A but with the aircraft indicated in a banked position.

Although safe ejection of a pilots seat is a relatively simple situation when the aircraft is flying in a path parallel to the ground as shown in FIG. 1A, the value of the present invention will be realized when the aircraft is banked as indicated in FIG. 1B. In this situation most transmitted radio altimeter signals such as 26 become scattered upon reflection as indicated by 28. However, as in the case of FIG. 1A, a high gain vector 22 will be measured. Thus, upon inversion of the vertically downward high gain vector by 180°, accurate upward vertical information can be supplied to an ejected chair even if that chair is ejected in a nonvertical direction. Of course, the propulsion system on board the ejected chair will right the chair into the vertically upward direction until the chair becomes sufficiently clear of the aircraft thereby allowing deployment of a parachute.

Figure 2:
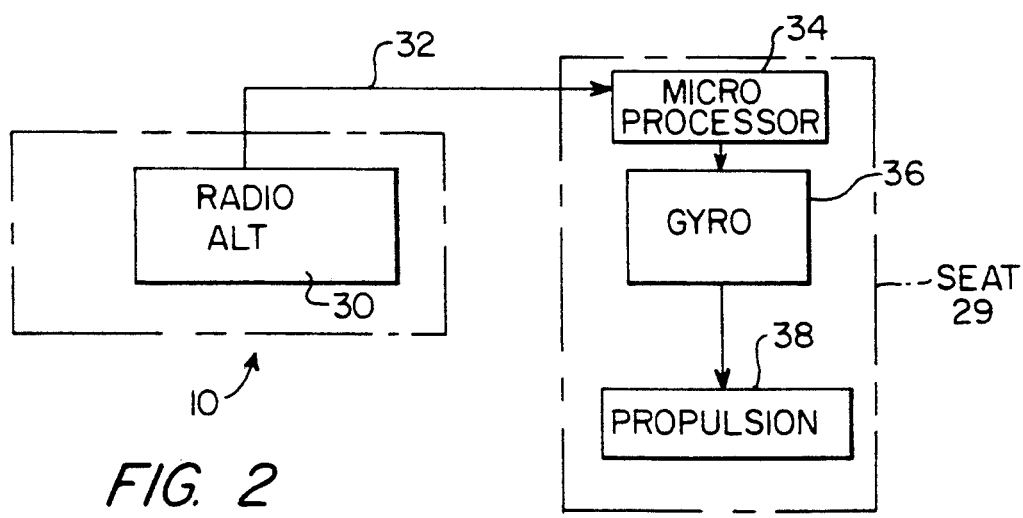
FIG. 2 is a schematic illustration of the present invention.

FIG. 2 is a schematic illustration of the present invention wherein the radio altimeter 30, of conventional design, is on board the aircraft 10. A signal representing the high gain vector 22 (FIGS. 1A, 1B) is output from the altimeter 30 to a microprocessor 34, the later installed in an ejection seat 29. The ejection seat is fitted with a relatively inexpensive conventional gyro 36 capable of executing three degrees of freedom. In normal operation of the aircraft, a microprocessor 34 inverts the downwardly directed high gain vector 22 by 180° so that a signal representing the upward vertical vector 24 is constantly supplied to gyro 36.

In the event the aircraft becomes disabled, the seat 29 is ejected and gyro 36 maintains the upwardly directed information which is input to a conventional propulsion system that drives rocket and jet nozzles in a manner orienting the ejected chair into an upwardly directed trajectory for sufficient time to clear the disabled aircraft and allow parachute deployment.

Accordingly, the present invention avoids the use of expensive and unreliable antennas mounted to an ejection seat. In lieu thereof, an inexpensive gyro or assembly of gyros are employed to follow an upward direction signal furnished by an already existing radio altimeter (after inversion by 180°). Accordingly, the present invention offers a solution to an important problem at minimum expense and change. It should be understood that the invention is not limited to the exact details of construction shown and described herein for obvious modifications will occur to persons skilled in the art.

I claim:

1. A method for orienting an ejection seat of an aircraft upon ejection therefrom comprising the steps:

reading high gain vector information from a terrain clearance altimeter, located on the aircraft, indicating the vertically downward direction from the aircraft;

adding 180° to the phase of the high gain vector thereby creating a signal representing the vertically upward direction from the aircraft;

providing the upward direction signal to at least one gyro installed in the seat thereby enabling the gyro to track the upward direction on a steady state basis;

ejecting the seat;

connecting a last received upward direction signal from the gyro, to a seat propulsion system thereby enabling the propulsion system to orient the ejected seat in an upward trajectory.

2. The method set forth in claim 1 together with the step of deploying a parachute, located in the seat, at a predetermined time after ejection.

3. A system for controlling the propulsion of an ejection seat on board an aircraft comprising:

means located on board the aircraft which detects a vertically downward directed high gain vector for determining terrain clearance;

means for adding 180° to the phase of the vector thereby generating a vertically upward vector signal;

at least one gyro, installed in the seat, and connected to the upward vector signal, for tracking the upward direction; and propulsion means mounted to the seat and receiving a signal from the gyro indicative of the vertically upward direction for orienting the ejected seat in an upward trajectory.

4. The system set forth in claim 3 wherein the means for detecting a vertically downward directed high gain vector is a radio altimeter.

5. The system set forth in claim 3 wherein the means for adding 180° to the vector phase is a microprocessor located in the seat.

* * * * *